(12) United States Patent
Fujiwara et al.

(10) Patent No.: US 7,685,344 B2
(45) Date of Patent: Mar. 23, 2010

(54) METHOD OF SETTING PRIORITY OF DEVICES CONNECTED TO BUS, AND APPARATUS HAVING A PLURALITY OF DEVICES AND ARBITER

(75) Inventors: Makoto Fujiwara, Tokyo (JP); Koichi Morishita, Setagaya-ku (JP); Shunichi Kaizu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 11/550,857

(22) Filed: Oct. 19, 2006

(65) Prior Publication Data

US 2007/0101031 A1    May 3, 2007

(30) Foreign Application Priority Data

Oct. 28, 2005   (JP) .............................. 2005-314842

(51) Int. Cl.
G06F 13/36 (2006.01)
G06F 13/00 (2006.01)
G06F 12/00 (2006.01)
G06F 13/14 (2006.01)
G06F 13/38 (2006.01)

(52) U.S. Cl. ........................ 710/113; 710/107; 710/116; 710/240; 710/241; 710/244

(58) Field of Classification Search ................. 710/113, 710/116, 244, 107, 240, 241
See application file for complete search history.

(56) References Cited

U.S. PATENT DOCUMENTS

| | | | | | |
|---|---|---|---|---|---|
| 5,506,969 | A | * | 4/1996 | Wall et al. ..................... | 710/107 |
| 5,675,751 | A | * | 10/1997 | Baker et al. .................. | 710/305 |
| 5,787,482 | A | * | 7/1998 | Chen et al. ................... | 711/158 |
| 5,901,296 | A | * | 5/1999 | Lackman et al. ............. | 710/113 |
| 5,907,688 | A | * | 5/1999 | Hauck et al. ................. | 710/107 |
| 5,948,089 | A | * | 9/1999 | Wingard et al. ............. | 710/107 |
| 6,006,303 | A | * | 12/1999 | Barnaby et al. ............. | 710/244 |
| 6,028,843 | A | * | 2/2000 | Delp et al. ................... | 370/235 |
| 6,189,064 | B1 | * | 2/2001 | MacInnis et al. ............ | 710/244 |

(Continued)

FOREIGN PATENT DOCUMENTS

EP     466555 A1 *  1/1992

(Continued)

OTHER PUBLICATIONS

Meyerowitz, T., Pinello, C., and Sangiovanni-Vincentelli, A., "A tool for describing and evaluating hierarchical real-time bus scheduling policies", Proceedings of the 40th Annual Design Automation Conference (Anaheim, CA, USA, Jun. 2-6, 2003), DAC '03, ACM, New York, NY, pp. 312-317.*

(Continued)

*Primary Examiner*—Mark Rinehart
*Assistant Examiner*—Faisal M Zaman
(74) *Attorney, Agent, or Firm*—Canon U.S.A., Inc., IP Division

(57) ABSTRACT

The remaining time period until the deadline of transfer by a device connected to a bus is measured, the remaining data size to be transferred by the device is detected, and the priority level of the device is set based on the remaining time period and the remaining data size.

19 Claims, 15 Drawing Sheets

U.S. PATENT DOCUMENTS

| | | | | |
|---|---|---|---|---|
| 6,324,570 | B1 * | 11/2001 | Tonchev et al. | 709/207 |
| 6,553,476 | B1 * | 4/2003 | Ayaki et al. | 711/204 |
| 6,728,792 | B2 * | 4/2004 | Wagner | 710/6 |
| 6,785,283 | B1 * | 8/2004 | Stichter | 370/395.42 |
| 6,801,943 | B1 * | 10/2004 | Pavan et al. | 709/226 |
| 6,804,738 | B2 * | 10/2004 | Weber | 710/244 |
| 6,845,417 | B2 * | 1/2005 | Kauffman et al. | 710/116 |
| 6,877,053 | B2 * | 4/2005 | Lahiri et al. | 710/113 |
| 6,934,818 | B2 * | 8/2005 | Okada | 711/154 |
| 7,080,177 | B2 * | 7/2006 | Neuman | 710/240 |
| 7,089,381 | B2 * | 8/2006 | Horn et al. | 711/158 |
| 7,093,044 | B2 * | 8/2006 | Joy et al. | 710/110 |
| 7,093,256 | B2 * | 8/2006 | Bloks | 718/102 |
| 7,197,577 | B2 * | 3/2007 | Nellitheertha | 710/6 |
| 7,302,686 | B2 * | 11/2007 | Togawa | 718/103 |
| 7,349,973 | B2 * | 3/2008 | Saito et al. | 709/229 |
| 2003/0167381 | A1 * | 9/2003 | Herscovich et al. | 711/151 |
| 2004/0230675 | A1 * | 11/2004 | Freimuth et al. | 709/223 |
| 2005/0207441 | A1 * | 9/2005 | Onggosanusi et al. | 370/464 |
| 2006/0190430 | A1 * | 8/2006 | Luo et al. | 707/3 |
| 2006/0242252 | A1 * | 10/2006 | Jiang | 709/207 |

FOREIGN PATENT DOCUMENTS

| | | | |
|---|---|---|---|
| EP | 837397 A2 | * | 4/1998 |
| EP | 1087572 A2 | * | 3/2001 |
| EP | 1217794 A2 | * | 6/2002 |
| JP | 05173930 A | * | 7/1993 |
| JP | 09231165 A | * | 9/1997 |
| JP | 10-289203 | | 10/1998 |
| WO | WO 9515528 A1 | * | 6/1995 |

OTHER PUBLICATIONS

Manolache, S., Eles, P., and Peng, Z., "Task mapping and priority assignment for soft real-time applications under deadline miss ratio constraints", ACM Trans. Embed. Comput. Syst. 7, 2 (Feb. 2008), ACM, pp. 1-35.*

Pop, P., Eles, P., and Peng, Z., "Bus access optimization for distributed embedded systems based on schedulability analysis", Proceedings of the Conference on Design, Automation and Test in Europe (Paris, France, Mar. 27-30, 2000), Date '00, ACM, New York, NY, pp. 567-575.*

Lin, B., Lee, G., Huang, J., and Jou, J., "A Precise Bandwidth Control Arbitration Algorithm for Hard Real-Time SoC Buses", Proceedings of the 2007 Asia and South Pacific Design Automation Conference (Jan. 23-26, 2007), Asia and South Pacific Design Automation Conference, IEEE Computer Society, Washington, DC, pp. 165-170.*

* cited by examiner

METHOD OF SETTING PRIORITY OF DEVICES CONNECTED TO BUS, AND APPARATUS HAVING A PLURALITY OF DEVICES AND ARBITER

BACKGROUND OF THE INVENTION

1. Field of the Invention

The present invention relates to a method of setting the priority of devices connected to a bus, and an apparatus having a plurality of devices and an arbiter.

2. Description of the Related Art

In a case that a plurality of masters (devices) use common resources (bus, memory), they use these resources by time-sharing. At this time, to which of masters the resource ownership is to be given must be arbitrated according to given rules (resource access priority of masters). Most popular arbitration schemes of those which are conventionally known are:

round robin;

fixed priority; and weighted priority.

The "round robin" arbitration scheme equally handles all the masters by setting the priority level of a given master which has acquired the resource ownership to a lowest level at the next arbitration. In this case, every time a master acquires the bus ownership, the priority level of the master is changed. A feature of this arbitration scheme lies in that the resource ownership can be equally given to all the masters. However, a master which requires a relatively large bandwidth sometimes cannot assure its bandwidth.

The "fixed priority" arbitration scheme statically determines the priority levels of respective masters in advance, and can set higher priority levels for a master that requires a large bandwidth and a master that requires to guarantee low-latency operations. In case of this arbitration scheme, because higher priority levels are given to masters that requires larger bandwidths, a master with a high priority level can assure a sufficient bandwidth. However, a master set with a low priority level suffers a disadvantage, i.e., a long inaccessible time to the resources.

The "weighted priority" scheme known as means for resolving the demerits of these "round robin" and "fixed priority" schemes gives a bandwidth assignment ratio like "4:3:2:1" to respective masters, and arbitrates to assign the resources at this ratio. In this case, it is expected to assign one resource at a ratio of four times, three times, twice, and once of 10 arbitrations. Various practical control schemes are available, and as the representative control scheme, the following scheme is known.

Every time a master acquires an ownership, the number of times of acquisition of the ownership is counted. When this count value matches a setting value, it is determined that this master has acquired the bandwidth it requested, and the master devolves the bus ownership to another master. More specifically, the master whose count value of the number of times of acquisition has matched the setting value repeats processing for devolving the ownership to another master until the count values of all other masters respectively match setting values. In this way, when the count values of all the masters become equal to the setting values, the count values of the number of times of acquisition of all the masters are cleared. By repeating this processing, the resources are assigned at the set ratio. In this case, in a situation that all the masters constantly issue access requests, assignment with a bandwidth that matches the ratio can be made. However, the count values are often small, and a situation that only a specific master acquires the ownership may occur depending on the way the masters issue the access requests.

For example, Japanese Patent Laid-Open No. 10-289203 describes a bus arbiter which preferentially assigns a bus to a device which is behind a reference. This bus arbiter comprises a reference counter which operates by clocks based on a transfer rate required for each device, and a transfer data counter which measures an actually transferred data size, so as to attain this assignment. The bus arbiter compare the values of these two counters upon bus arbitration.

As the above arbitration scheme, especially, that which enhances the weighted priority scheme, an arbitration scheme which lowers the priority level of a master that has acquired its required bandwidth by counting an actual transfer size with respect to the required bandwidth for each master is proposed. With this scheme, a specific master never monopolizes the resource ownership further beyond the required bandwidth, and arbitration according to the required bandwidths of individual masters can be made. No relative ratio is set unlike in the "weighted priority" scheme, and required values of respective masters can be directly set. If a plurality of masters have not acquired their required bandwidths, the resource ownership is always assigned to a specific master or its assignment is determined by the round robin scheme.

In case of this scheme, in a case where the total of the required bandwidths to the shared resource does not exceed 100%, the required bandwidths of respective masters are satisfied. However, in a case where the total of the required bandwidths to the shared resource exceeds 100% for a predetermined period of time, the resource ownership is unlikely to be assigned to a master to be actually prioritized. If a master to be prioritized can be determined before operation in a case where the total of the required bandwidths exceeds 100%, this scheme suffices. However, if the priority order of masters cannot be set in advance in a case where the total of the required bandwidths exceeds 100%, it is difficult to assign bandwidths to satisfy the required bandwidths of respective masters.

SUMMARY OF THE INVENTION

The feature of the present invention is to optimize access to a bus by a plurality of masters (devices).

Another feature of the present invention is to set the priority level of a device or that of a bus access request based on the remaining time period until a data transfer deadline, and a remaining data size.

Another feature of the present invention is to provide a method of setting a priority level of a device connected to a bus, comprising the steps of: measuring a remaining time period until a deadline of data transfer by the device; detecting a remaining data size to be transferred by the device; and setting a priority level of the device based on the remaining time period and the remaining data size.

Another feature of the present invention is to provide an apparatus for setting a priority level of a device connected to a bus, comprising: a time measuring unit configured to measure a remaining time period until a deadline of data transfer by the device; a detection unit configured to detect a remaining data size to be transferred by the device; and a setting unit configured to set a priority level of the device based on the remaining time period and the remaining data size.

Another feature of the present invention is to provide an apparatus having a plurality of devices connected to a bus, and an arbiter which arbitrates bus access requests by the plurality of devices, comprising: a time measuring unit configured to measure a remaining time period until a deadline of data transfer by the device which transfers data onto the bus; a detection unit configured to detect a remaining data size to be transferred by the device which transfers data onto the bus; and a setting unit configured to set a priority level of the device based on the remaining time period and the remaining data size.

Another feature of the present invention is to provide an apparatus for requesting access of a bus to an arbiter, comprising: a time measuring unit configured to measure a remaining time period until a deadline of data transfer; a detection unit configured to detect a remaining data size to be transferred; a request unit configured to request access to the bus to the arbiter; and a setting unit configured to set a priority level of a bus access request based on the remaining time period and the remaining data size.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

The preferred embodiments of the present invention will be described below in detail with reference to the accompanying drawings. The following embodiments do not limit the claims of the present invention, and not all combinations of features described in the embodiments are essential in solving means of the present invention.

Prior to an explanation of this embodiment, "deadline guarantee" as a scheme for solving the problems of "average rate guarantee" discussed in the description of the related arts will be described below.

When the total of the required bandwidths to a shared resource exceeds 100% of the transfer capability of that shared resource, optimal arbitration is made in consideration of the remaining time period to the deadline of each individual master. In this way, in place of setting an arbiter in consideration of a relative required bandwidth ratio among masters as the settings of the arbiter, the arbiter performs appropriate arbitration to attain deadline guarantee in real time by giving parameters (guarantee period, guarantee data size) of each individual master. The arbiter which attains this deadline guarantee gives parameters, i.e., a guarantee period and guarantee data size to each master, and arbitrates a bus ownership so that "each master finishes transferring data of the guarantee data size within its guarantee period". In this way, since the guarantee period and guarantee data size are set for each master, the arbiter calculates the sufficiency/insufficiency with respect to the required bandwidth of each master in real time. At the same time, the arbiter arbitrates an optimal bus ownership using the urgency of deadline of each master. As a result, the QoS (Quality of Service) of each master can be achieved. More specifically, an arbitration circuit makes the following calculation using its internal counter value:

(1) the urgency of transfer required to finish transferring data of the guarantee data size within the guarantee period.

The arbitration circuit calculates the urgency of data transfer for each master, compares the calculation results of the urgencies of respective masters as evaluation values, and assigns a bus ownership to a master with the largest evaluation value. The large evaluation value means a short remaining time period until completion of transfer, or a large remaining data size until completion of transfer. This arbitration circuit operates to assign priority of bus access to a master with the largest evaluation value.

First Embodiment

Figure 1:
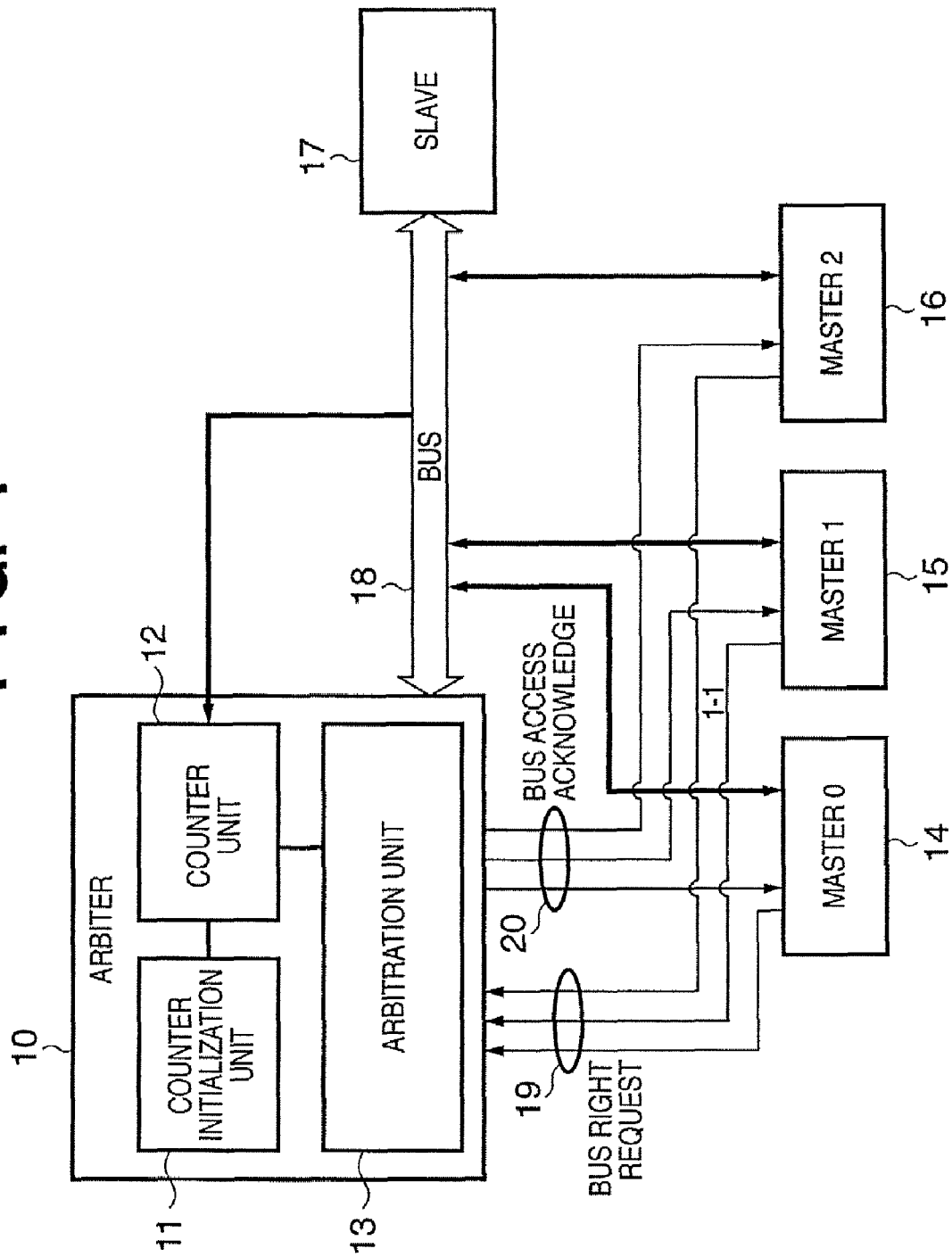
FIG. 1 is a block diagram showing the arrangement of a bus arbiter according to a first embodiment of the present invention.

FIG. 1 is a block diagram showing the arrangement of a bus arbiter according to the first embodiment of the present invention. In this bus arbiter, a bus system in which three masters 0 to 2 denoted by reference numerals 14 to 16 and one slave denoted by reference numeral 17 are connected will be explained for the sake of simplicity. However, upon practicing the present invention, the number of masters and the number of slaves are not particularly limited.

This first embodiment exemplifies a bus system in which each of masters 14 to 16 transfers data to a slave 17 via a bus 18. Since the plurality of masters 14 to 16 use the common bus 18, they cannot simultaneously transfer data. For this reason, an arbiter 10 arbitrates an access to the bus 10 to determine to which of the masters an ownership of the bus 18 is to be assigned. The masters 14 to 16 issue bus ownership request signals 19 to the arbiter 10. As a result, the arbiter 10 issues a bus access acknowledge signal 20 to the master determined based on the priority order. The master which has acquired the bus ownership from the arbiter 10 occupies the bus 18 and performs data transfer with the slave 17 via the bus 18.

An arbitration unit 13 of the arbiter 10 determines to which of the masters that issued requests a bus ownership is assigned in accordance with the bus right request signals 19 from the masters. That is, the arbitration unit 13 returns the bus access acknowledge signal 20 to the master determined according to the priority order so that the master gets an access permission to the bus 18. In this case, the arbitration unit 13 determines the priority order based on count values (evaluation values) from a counter unit 12. The counter unit 12 has transfer time counters and transfer data size counters for respective masters. The transfer time counter measures an elapsed time period from the beginning of data transfer for each master. The transfer data size counter monitors the bus 18 to measure a data size transferred from the beginning of data transfer for each master.

The value of this transfer time counter is compared with a required transfer time period which is set in advance to calculate the remaining transfer time period of each master. Furthermore, the remaining transfer data size is calculated based on the value of the transfer data size counter and a required transfer data size which is set in advance. An arithmetic circuit makes arithmetic operations based on these calculated remaining transfer time periods and remaining transfer data sizes to determine the evaluation values, and notifies the arbitration unit 13 of the evaluation values. Note that the respective masters set their required transfer time periods and required transfer data sizes of respective masters in the arbiter 10 prior to transfer requests from the masters.

A counter initialization unit 11 initializes the transfer time counters and transfer data size counters by its counter initialization signal. The counter initialization unit 11 has means for detecting the transfer start timing of each master, and outputs a counter initialization signal synchronous with the transfer start timing of each master to the counter unit 12. As the means for detecting the transfer start timing, detection means based on a transfer start notification signal from each master or the like may be used.

The internal processing of the counter unit 12 will be described below with reference to FIG. 2.

Figure 2:
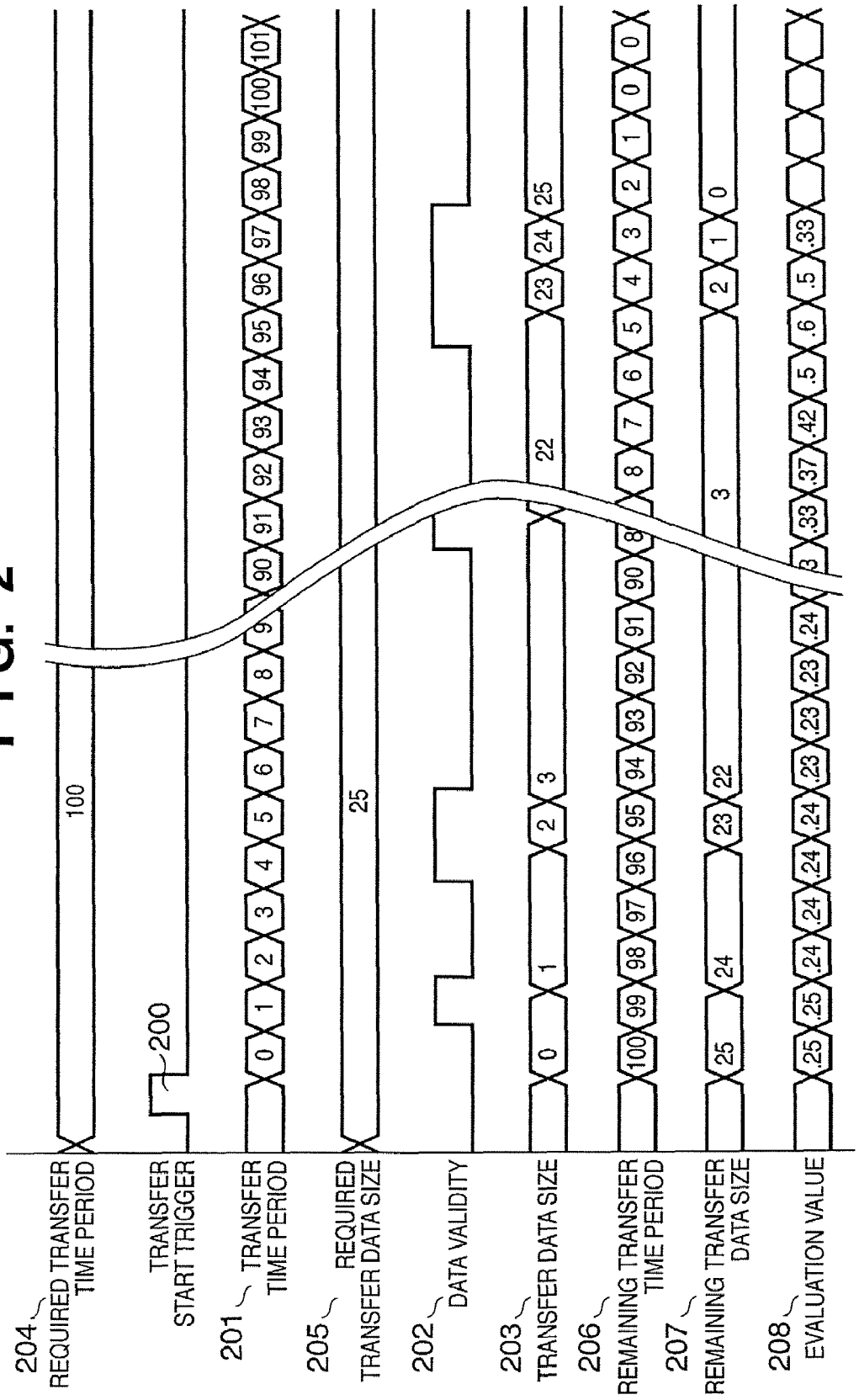
FIG. 2 is a timing chart for explaining the operation of the arbiter according to the first embodiment.

FIG. 2 is a timing chart for explaining the operation of the arbiter 10 according to the first embodiment.

The counter unit 12 has a function of calculating evaluation values used in evaluation for arbitration for respective masters. FIG. 2 shows a method of calculating an evaluation value per master.

The counter unit 12 has the transfer time counter used to calculate the remaining transfer time period for each master, and the transfer data size counter used to calculate the remaining transfer data size. These transfer time counter and transfer data size counter are initialized by a transfer start trigger 200. After that, the transfer time counter counts up for each cycle to measure an elapsed time period from the beginning of transfer, as denoted by reference numeral 201.

The transfer data size counter monitors the bus, and counts up at a data transfer timing (denoted by reference numeral 202) of the master of interest to measure a data transfer size from the beginning of transfer, as denoted by reference numeral 203.

A required transfer time period 204 and required transfer data size 205 from the transfer start trigger 200 are set in advance.

A remaining transfer time period 206 is calculated based on the difference between the required transfer time period 204 and the count value 201 of the transfer time counter. A remaining transfer data size 207 is calculated based on the difference between the required transfer data size 205 and the count value 203 of the transfer data size counter.

Reference numeral 208 denotes an evaluation value calculated by the arithmetic circuit based on the remaining transfer time period 206 and the remaining transfer data size 207. FIG. 2 shows the evaluation value 208 as the arithmetic operation result of "remaining data size/remaining transfer time period".

Note that the counters and arithmetic circuit used to calculate the evaluation value shown in FIG. 2 are mounted for each master. The evaluation values 208 of respective masters are simultaneously output to the arbitration unit 13. The arbitration unit 13 operates to set a higher priority level for a master with a larger evaluation value, and to preferentially give a bus access acknowledge to the bus right request from a master with a large evaluation value.

Figure 3:
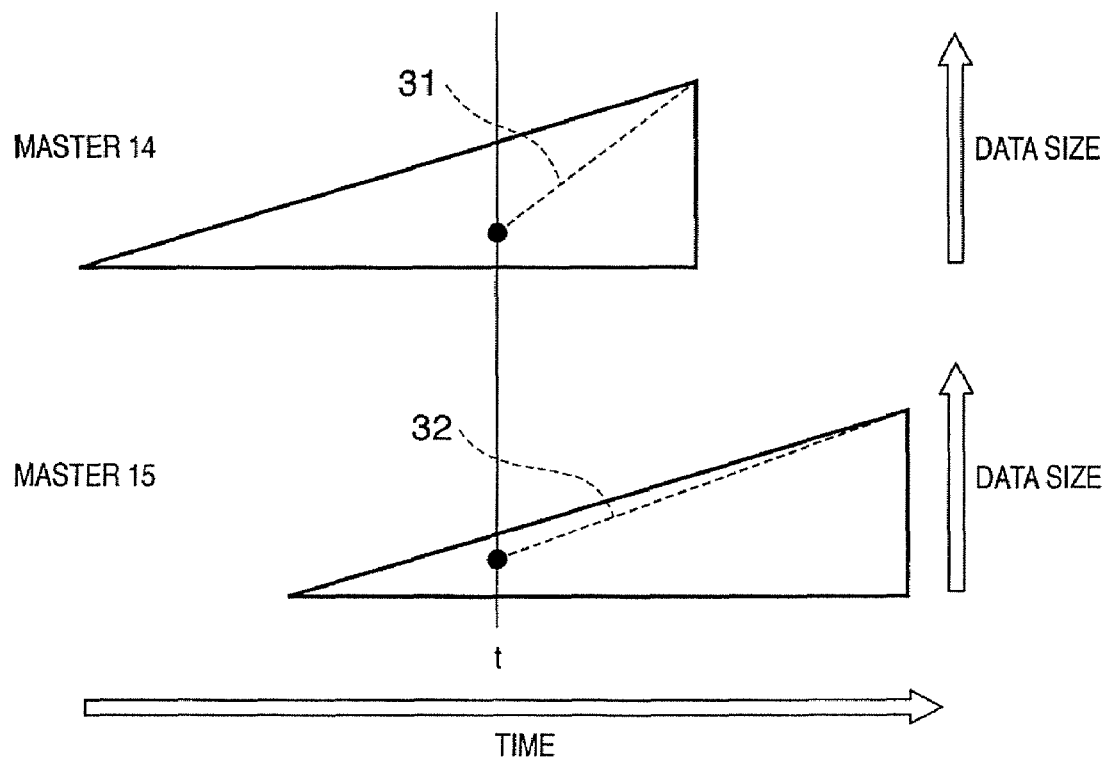
FIG. 3 depicts a view for plainly explaining evaluation values calculated for respective masters in the first embodiment.

FIG. 3 depicts a view for explaining the evaluation values calculated for respective masters. FIG. 3 illustrates a data transfer state in a case that the two masters 14 and 15 have the same required transfer time period and required transfer data size, and different transfer start timings for the sake of simplicity.

In triangles indicated by the masters 14 and 15, the bottom side represents the required transfer time period, and the height represents the required transfer data size. The slope of each triangle represents the average transfer rate required to guarantee the deadline.

The black dots inside the triangles indicate positions at time t, which represent the elapsed time periods and transferred data sizes from the transfer start timings of the respective masters. The two masters have the same required average transfer rate. The first embodiment is configured to calculate the evaluation values for respective masters and assign a bus ownership in accordance with the evaluation values.

In FIG. 3, in a case that the evaluation value is calculated by "remaining data size/remaining transfer time period", the evaluation values of the respective masters at time t are indicated by dotted lines 31 and 32. That is, the dotted line 31 indicates the evaluation value of the master 14, and the dotted line 32 indicates that of the master 15. In the example of FIG. 3, since the evaluation value of the master 14 is larger than that of the master 15, the priority level of the master 14 is set to be higher than that of the master 15. The evaluation values change as time elapses or as data transfer progresses. However, the priority levels of these masters 14 and 15 stay the same unless the magnitude relationship between the evaluation values of the masters 14 and 15 changes.

In case of FIG. 3, a high priority level is set at time t for the master 14. When a bus right request of the master 14 is issued, the arbitration unit 13 successively assigns a bus ownership to the master 14 unless the magnitude relationship between the evaluation values changes. If the magnitude relationship between the evaluation values changes and the evaluation value of the master 15 becomes larger than that of the master 14, then the arbitration unit 13 operates to preferentially assign a bus ownership to the master 15.

As described above, according to the first embodiment, the priority order can be dynamically switched in accordance with the operation states of the masters, and appropriate arbitration can be made for the masters.

Second Embodiment

The second embodiment of the present invention will be described below. Since the principal parts of the arrangement and operation of an arbiter of the second embodiment are the same as FIGS. 1 and 2 of the first embodiment, a description thereof will be omitted.

In addition to the first embodiment that determines the evaluation value based on the remaining transfer time period and remaining transfer data size, the second embodiment gives a transfer capability value unique to each master to that master as a parameter. Assume that the transfer capability value is the average value of a transfer rate which can be attained, in a case that that master solely occupies the bus.

That is, a transfer rate required to complete transfer of the remaining data before the deadline is calculated based on the remaining transfer time period and remaining transfer data size by:

(Remaining data transfer size)/(Remaining transfer time period)    (1)

By dividing the value calculated using expression (1) by the transfer capability of the master, a new priority evaluation value is defined as follows:

(Remaining data transfer size)/(Remaining transfer time period)/(Transfer capability of master)    (1)

This expression (2) yields a value used to determine how strict the deadline request imposed on a master having a given transfer capability is. As the value calculated by expression (2) is larger, this means that data transfer at a transfer rate closer to the transfer capability unique to the master is required. Also, when the value reaches "1", this means that the master cannot meet its data transfer request unless the master can solely occupy the bus, since the required rate matches the transfer capability of that master.

The counter unit 12 calculates a bus access urgency of each master based on expression (2) for each master.

On the other hand, the arbitration unit 13 compares the evaluation values (urgencies), and determines priority by giving a higher priority level to a master with a large evaluation value. For example, the arbitration unit 13 determines that a master with a value "0.5" has a higher urgency upon execution of transfer at this time than a master with a value "0.1", and gives priority to that master.

By calculating and comparing the evaluation values in real time, priority management with high precision can be attained.

A value calculated based on the remaining transfer time, remaining data transfer size, and transfer capability parameter by the arithmetic circuit is used as the evaluation value of the master.

Figure 4:
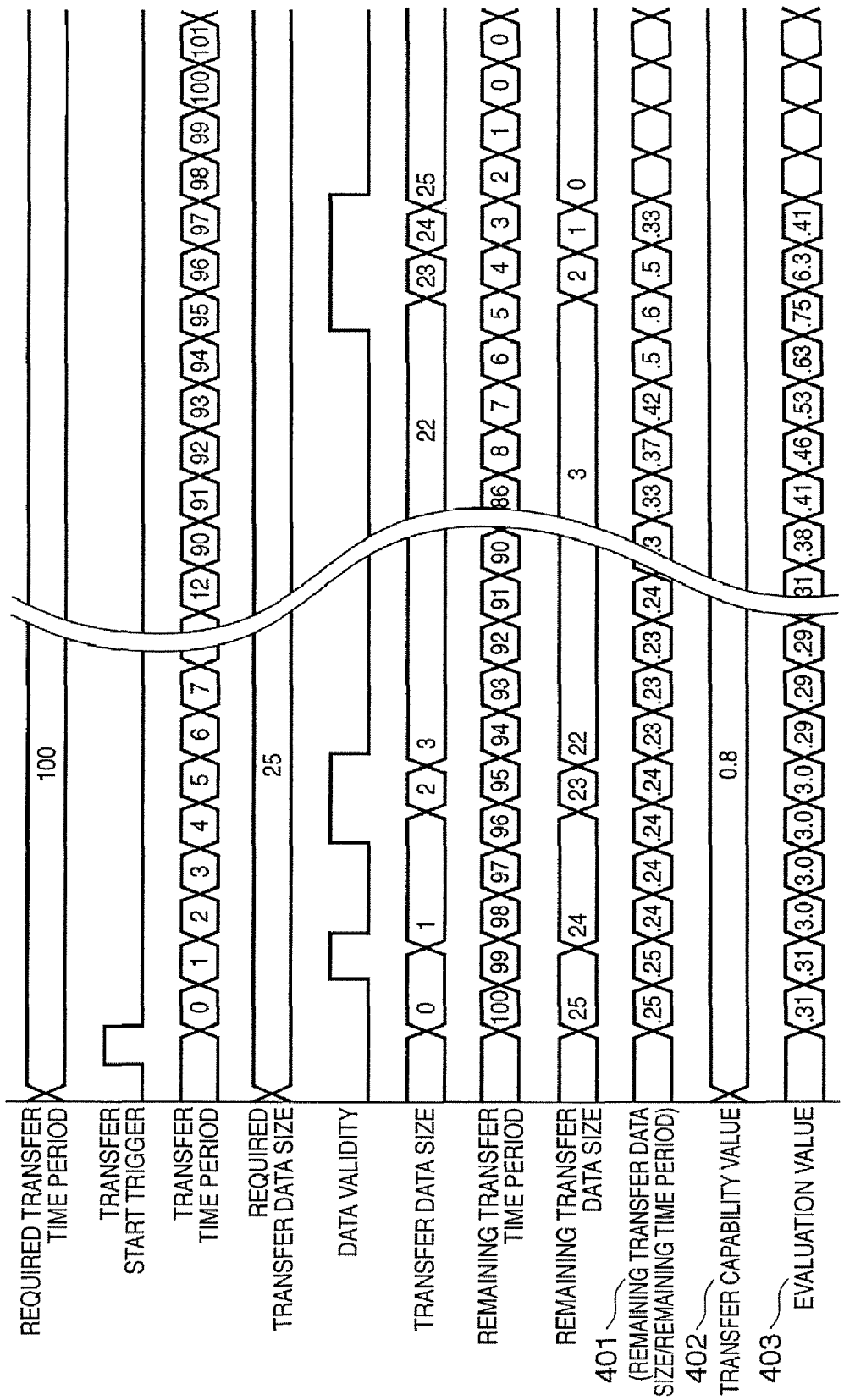
FIG. 4 is a timing chart for explaining the operation of an arbiter according to a second embodiment of the present invention.

FIG. 4 is a timing chart for explaining the operation of the arbiter 10 according to the second embodiment of the present invention. In FIG. 4, the contents from "required transfer time period" to "remaining transfer data size" are the same as those in FIG. 2 of the first embodiment.

Referring to FIG. 4, reference numeral 401 denotes an arithmetic result of {(remaining data transfer size)/(remaining transfer time period)} given by expression (1) above. A transfer capability value 402 is a value given to this master, and is "0.8" in this case. An evaluation value 403 is calculated by dividing the arithmetic result of {(remaining data transfer size)/(remaining transfer time period)} by this transfer capability value (0.8) (expression (2)).

The counters and arithmetic circuit used to calculate the evaluation value shown in FIG. 4 are mounted for each master, and the evaluation values of respective masters are simultaneously output to the arbitration unit 13. The arbitration unit 13 operates to set a high priority level for a master with a large evaluation value, and to give a bus access acknowledge to the bus right request from a master with a large evaluation value.

Figure 5:
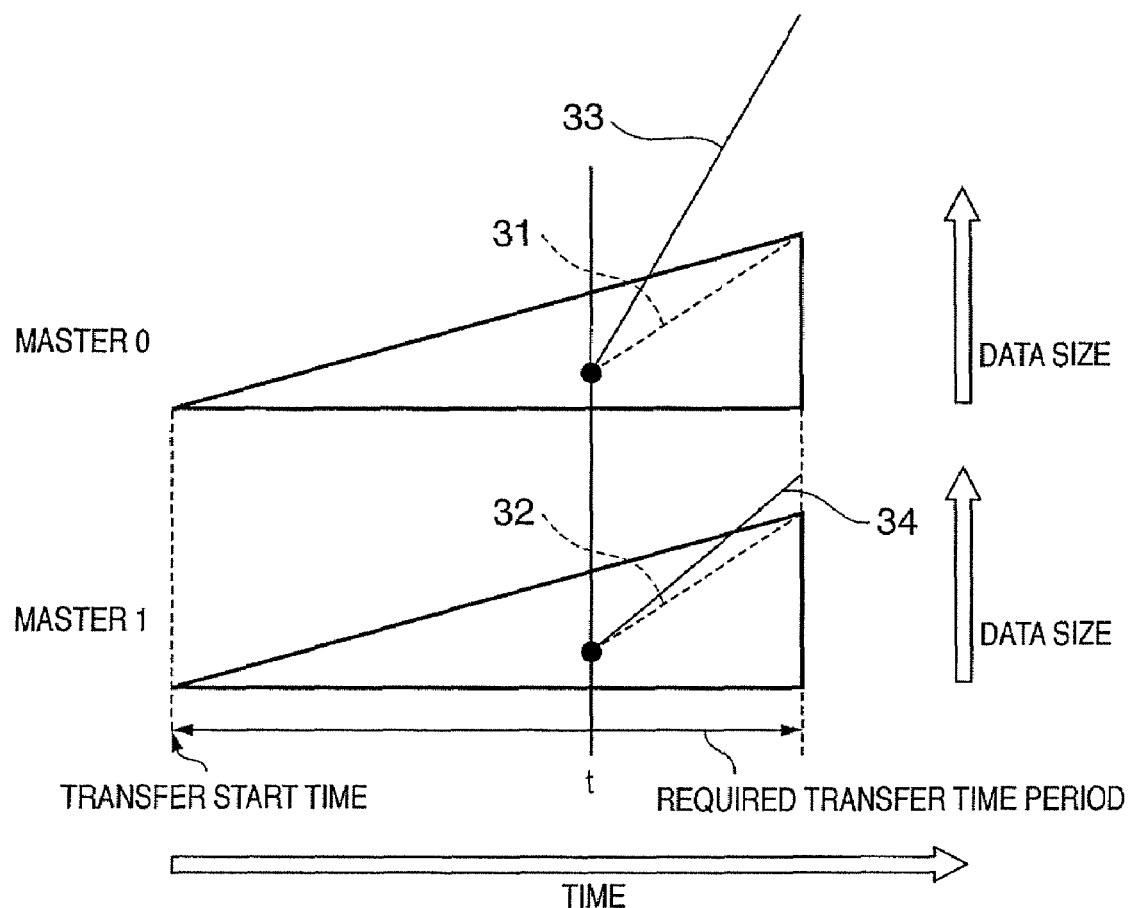
FIG. 5 depicts a view for plainly explaining evaluation values calculated for respective masters in the second embodiment.

FIG. 5 depicts a view for explaining the evaluation values calculated for respective masters in the second embodiment.

Assume that in FIG. 5, two masters (masters 0 and 1 denoted by reference numerals 14 and 15) simultaneously start data transfer and are expected to attain deadline guarantee within the same required period for the sake of simplicity. The abscissa is the time axis, and masters 0 and 1 have the same value of a transfer rate (remaining data size/remaining time period) required to complete deadline guarantee at given time t. Slopes 33 and 34 of lines represent the transfer capabilities of masters 0 and 1. In practice, these slopes 33 and 34 (=average transfer rates) of the lines are set in advance as parameters.

FIG. 5 illustrates an example in which the transfer capability of master 0 is higher than that of master 1. Hence, the evaluation value given by expression (2) above of master 1 is larger than that of master 0. As a result, the priority level of master 1 becomes higher at time t. By performing calculations of the urgencies and assignment of the bus ownership in real time, the bus ownership can be assigned to a master with a heaviest load at that time. A flexible response can be taken for a master which asynchronously starts bus access.

Figure 6:
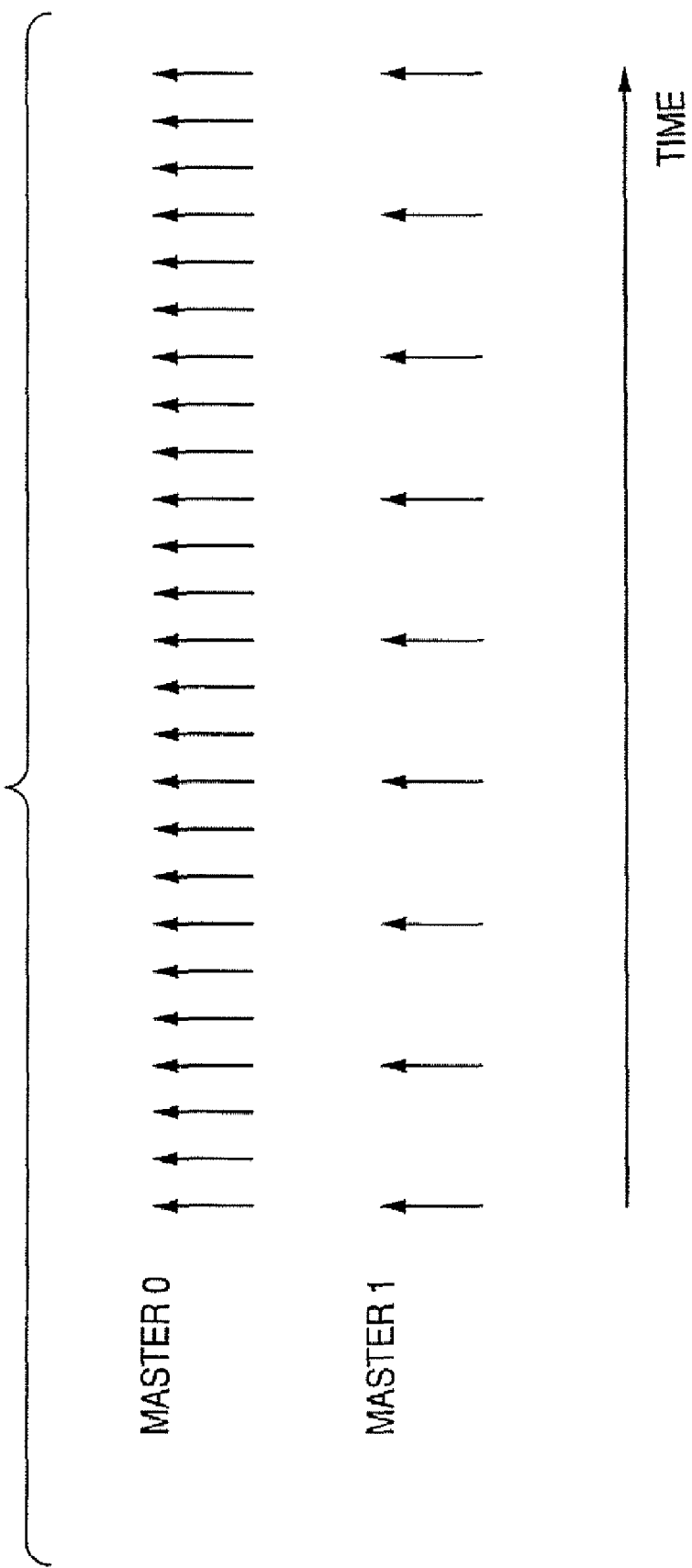
FIG. 6 depicts a view for explaining transfer capabilities of masters 0 and 1 according to the second embodiment.

FIG. 6 depicts a view for explaining the transfer capabilities of masters 0 and 1 according to the second embodiment. In FIG. 6, master 0 has a transfer capability about three times that of master 1.

As described above, according to the second embodiment, since the transfer capability is added to arbitration conditions of data transfer by each master, deadline guarantee with high precision can be attained according to the characteristics of the master.

Also, the transfer capability of the master may be given by an average transfer rate, i.e., a parameter which is relatively simple and easy to estimate.

Third Embodiment

Figure 7:
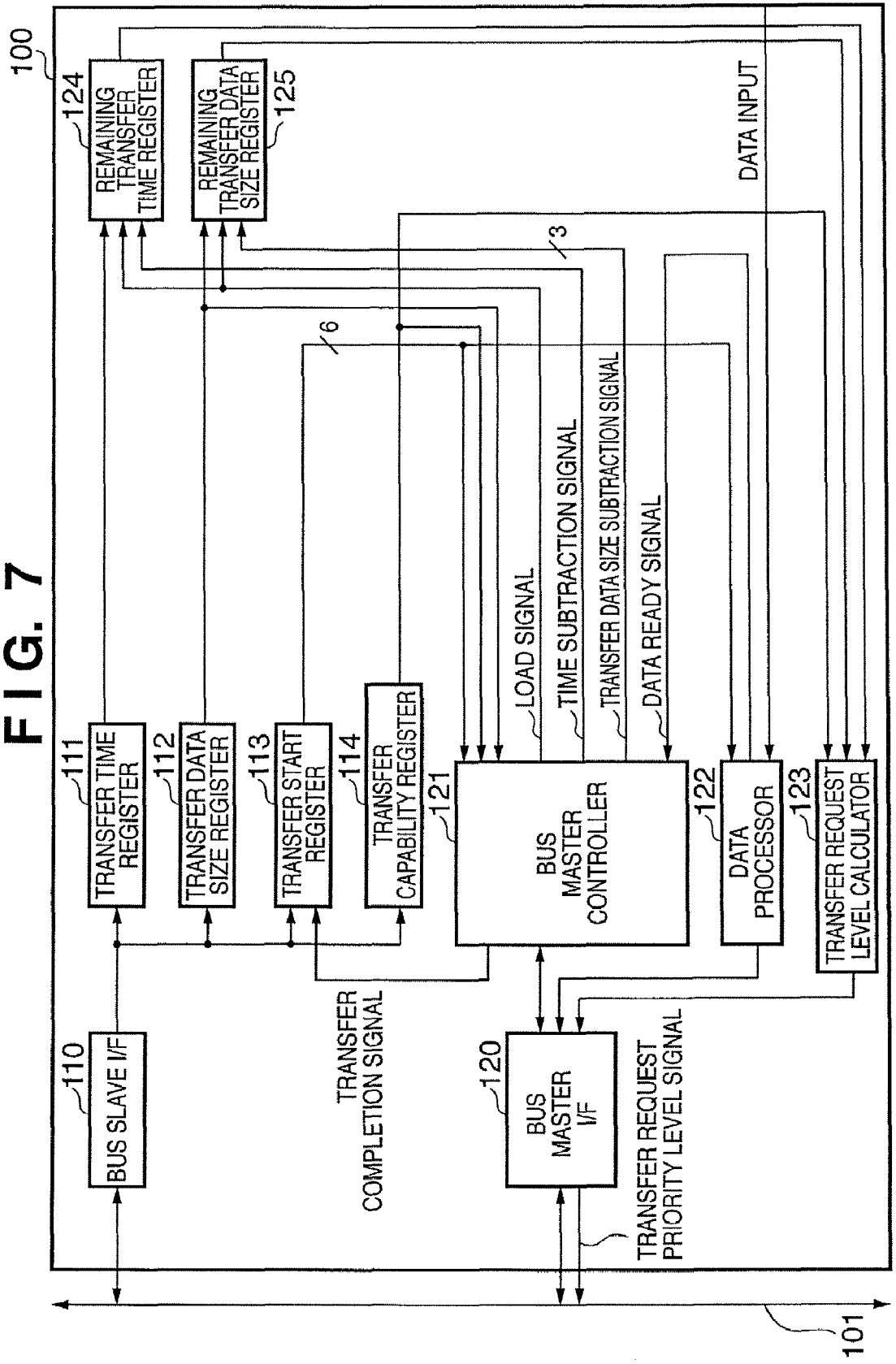
FIG. 7 is a block diagram showing the arrangement of a bus master according to a third embodiment of the present invention.

FIG. 7 is a block diagram showing the arrangement of a bus master according to the third embodiment of the present invention.

This bus master 100 comprises a bus slave I/F 110, transfer time register 111, transfer data size register 112, transfer start register 113, transfer capability register 114, bus master I/F 120, bus master controller 121, data processor 122, transfer request level calculator 123, remaining transfer time register 124, and remaining transfer data size register 125.

Figure 8:
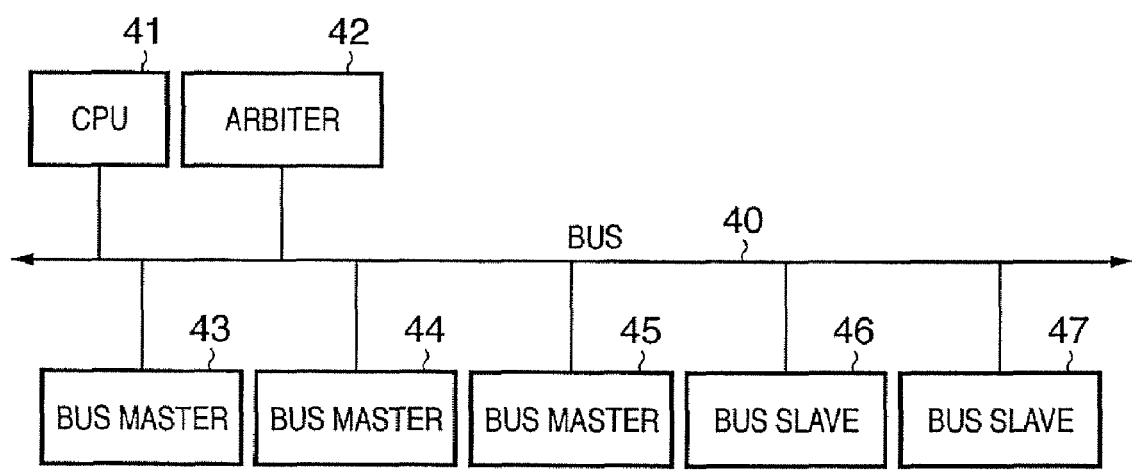
FIG. 8 is a schematic block diagram showing the arrangement of a system using the bus master according to the third embodiment.

FIG. 8 is a schematic block diagram showing the arrangement of a system using the bus master 100 according to the third embodiment.

This bus system comprises a bus 40, CPU 41, arbiter 42, bus masters 43 to 45, and bus slaves 46 and 47. Of these components, the bus masters 43, 44, and 45 respectively correspond to the bus master 100 shown in FIG. 7.

An overview of the bus master 100 shown in FIG. 7 will be explained below. The bus slave I/F 110 is an interface which accepts a register access from a CPU (corresponding to the CPU 41 in FIG. 8) on a bus 101. The transfer time register 111 is a register which sets a transfer time period (i.e., the maximum value of a time period from transfer start to transfer end) required for data transfer by the bus master 100 in 1-μs units. The transfer data size register 112 is a register which sets a transfer size of data to be transferred in byte units. The bus master 100 starts data transfer when "1" is written in the transfer start register 113, and automatically clears the transfer start register 113 upon completion of this data transfer.

The transfer capability register 114 is a 6-bit register in which the transfer capability of the bus master 100 is set. In this register 114, the average transfer capability when the bus master 100 solely performs data transfer (i.e., when bus right permission is continuously granted to only the bus master 100) is set (unit: words/cycle). The setting range of this transfer capability register 114 ranges from "0.01325 ($=2^{-5}$)" to "1 ($=2^0$)". It is possible to make a setting beyond "1" in terms of hardware, but since it is impossible for the bus system according to the third embodiment to make data transfer which exceeds one word/cycle, the upper limit is set to be "1".

The bus master I/F 120 is an interface used to make data transfer between a bus slave (corresponding to the bus slave 46 or 47 in FIG. 8) and the data processor 122 (to be described later). The bus master controller 121 controls the bus master I/F 120, the transfer start register 113, and the remaining transfer time register 124 and remaining transfer data size register 125 (to be described later). The data processor 122 generates or receives transfer data, and has different arrangements such as a block that performs image processing, an interface block that communicates with an external device, and the like depending on functions required for the bus master 100.

Details of the bus master 100 according to the third embodiment will be described below.

When the CPU 41 on the bus 101 writes "1" in the transfer start register 113, the bus master controller 121 asserts a load signal to the remaining transfer time register 124 and remaining transfer data size register 125. In response to this signal, the value of the transfer time register 111 is copied to the remaining transfer time register 124, and that of the transfer data size register 112 is copied to the remaining transfer data size register 125. After that, the bus master controller 121 asserts a time subtraction signal to the remaining transfer time register 124 for every 1 μs. Also, the bus master controller 121 asserts a subtraction signal of a data transfer size for the number of transferred bytes to the remaining transfer data size register 125 every time the data transfer is made. For example, in the third embodiment, 1 word on the bus 101 has 4 bytes. For this reason, the controller 121 asserts a transfer data size subtraction signal "4" for 1-word transfer; it asserts "2" for half-word transfer; and it asserts "1" for byte transfer. The remaining transfer data size register 125 subtracts the value of the transfer data size subtraction signal from its own value.

With the above processing, the values of the remaining transfer time register 124 and remaining transfer data size register 125 are subtracted to appropriately update the values of the remaining transfer time period and remaining transfer data size.

The data processor 122 is also activated when "1" is written in the transfer start register 113. When the data processor 122 is ready to transmit or receive data, it asserts a data ready signal to the bus master controller 121. Upon being asserted with this data ready signal, the bus master controller 121 controls the bus master I/F 120 to assert a transfer request signal to an arbiter (corresponding to the arbiter 42 in FIG. 8) on the bus 101.

On the other hand, the transfer request level calculator 123 calculates the priority level of data transfer based on the values of the remaining transfer time register 124, remaining transfer data size register 125, and transfer capability register 114.

The calculation in the transfer request level calculator 123 according to the third embodiment is "(value of remaining transfer data size register 125)/value of remaining transfer time register 124)/value of transfer capability register 114" corresponding to expression (2) above. With this calculation, the transfer request priority level increases with decreasing remaining time period, in a case that the remaining data size remains the same.

On the other hand, the transfer request priority level increases with increasing remaining data size in a case where the remaining time period remains the same. Furthermore, the transfer request priority level increases for a bus master with a lower transfer capability, in a case where the value of "remaining data size/remaining time period" remains the same. The bus master I/F 120 outputs the calculation result of the transfer request level calculator 123 to the arbiter 42 as a transfer request priority level signal. The assert timing of this transfer request priority level signal falls within an identical cycle to start of assertion of the transfer request signal, and the value is held until completion of the data transfer.

The arbiter 42 preferentially grants a transfer permission to a bus master which sent a transfer request priority level signal having a larger value. In a case that there are a plurality of bus masters which sent a transfer request priority level signal having a maximum value, the arbiter 42 makes bus arbitration using the round robin scheme for the bus masters with the maximum value.

With the above arrangement and method, appropriate deadline guarantee can be made for respective bus masters.

Fourth Embodiment

Figure 9:
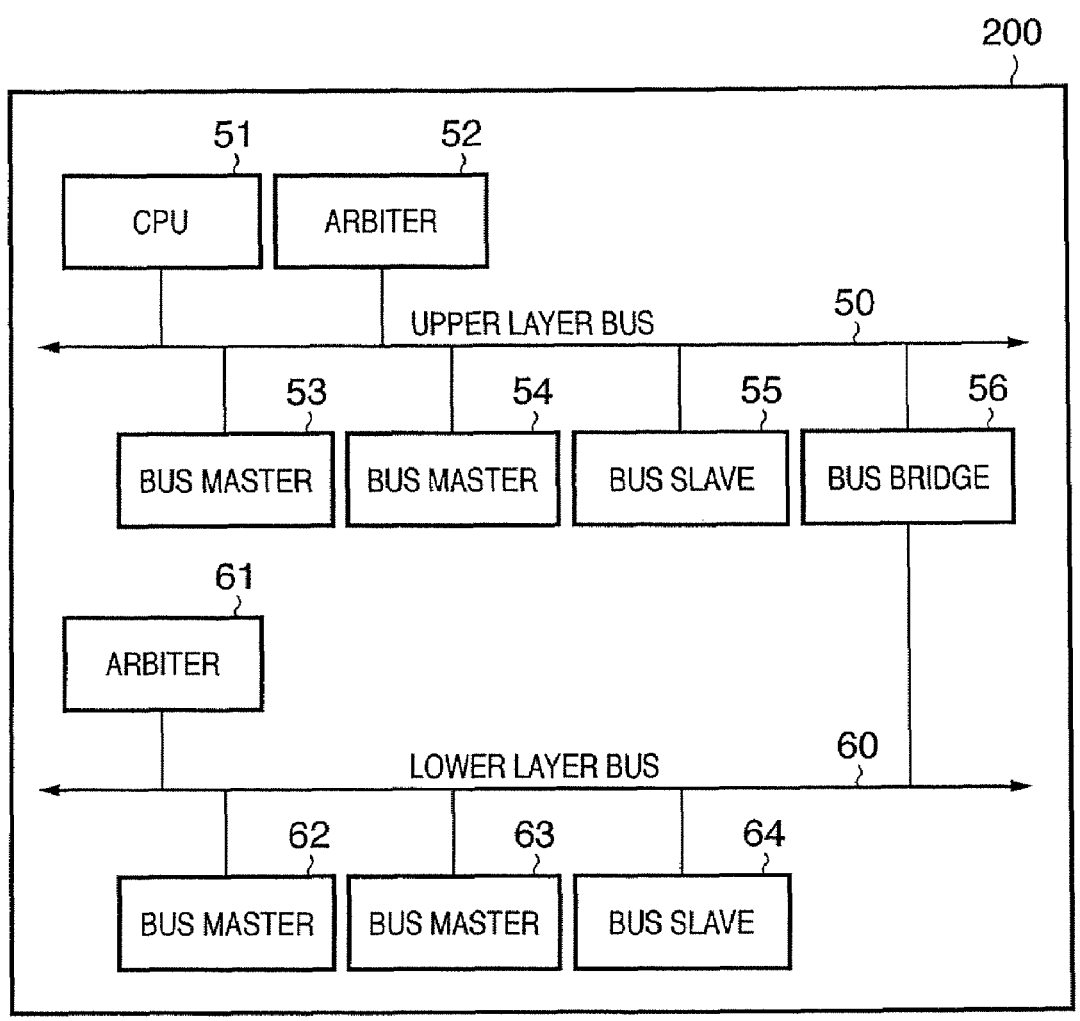
FIG. 9 is a schematic block diagram showing the arrangement of a system using a bus master according to a fourth embodiment of the present invention.

FIG. 9 is a schematic block diagram showing the arrangement of another system using the bus master 100 according to the fourth embodiment of the present invention.

In this system, a CPU 51, arbiter 52, bus masters 53 and 54, and bus slave 55 are connected to an upper layer bus 50. Also, the upper layer bus 50 is connected to a lower layer bus 60 via a bus bridge 56. An arbiter 61, bus masters 62 and 63, and bus slave 64 are connected to the lower layer bus 60. Of these components, the CPU 51 is the same as the CPU 41 in FIG. 8, and the arbiters 52 and 61 are substantially the same as the arbiter 42 in FIG. 8 except for the number of channels of bus masters. The bus masters 53, 54, 62, and 63 respectively correspond to the bus master 100 in FIG. 7, and the bus slaves 55 and 64 are the same as the bus slaves 46 and 47 in FIG. 8.

The difference from FIG. 8 according to the aforementioned third embodiment is that a hierarchy structure of two buses, i.e., the upper layer bus 50 and lower layer bus 60 is adopted. The arbiter 52 performs bus arbitration on the upper layer bus 50, and the arbiter 61 performs bus arbitration on the lower layer bus 60. Transfer across the bus layers is made via the bus bridge 56.

A case will be explained below wherein data transfer is made from the bus master 62 on the lower layer bus 60 to the bus slave 55 on the upper layer bus 50 as an example of transfer across the bus layers.

The bus master 62 sends a transfer request signal to the arbiter 61 together with a transfer request priority level signal. In a case that the arbiter 61 grants transfer permission in response to this, the bus master 62 starts data transfer to the bus slave 55 via the bus bridge 56. In response to this data transfer, the bus bridge 56 requests data transfer to the arbiter 52 together with the transfer request priority level signal issued by the bus master 62. That is, the bus bridge 56 serves as one of bus masters on the upper layer bus 50. The transfer request priority level signal inherits the value output from the bus master 62 on the lower layer bus 60. If the arbiter 52 grants a transfer permission on the upper layer bus 50, then the bus bridge 56 performs data transfer to the bus slave 55, thus ending the data transfer operation.

The arbitration operation of the arbiters 52 and 61 is the same as that in the third embodiment, and preferentially grants the transfer request permission to a bus master which sent a transfer request priority level signal having a larger value. In a case that there are a plurality of bus masters which sent a transfer request priority level signal having a maximum value, each of the arbiters 52 and 61 makes bus arbitration using the round robin scheme for the bus masters with the maximum value.

With the above arrangement and method, even in a hierarchical bus system, appropriate deadline guarantee can be attained for respective bus masters.

Figure 10:
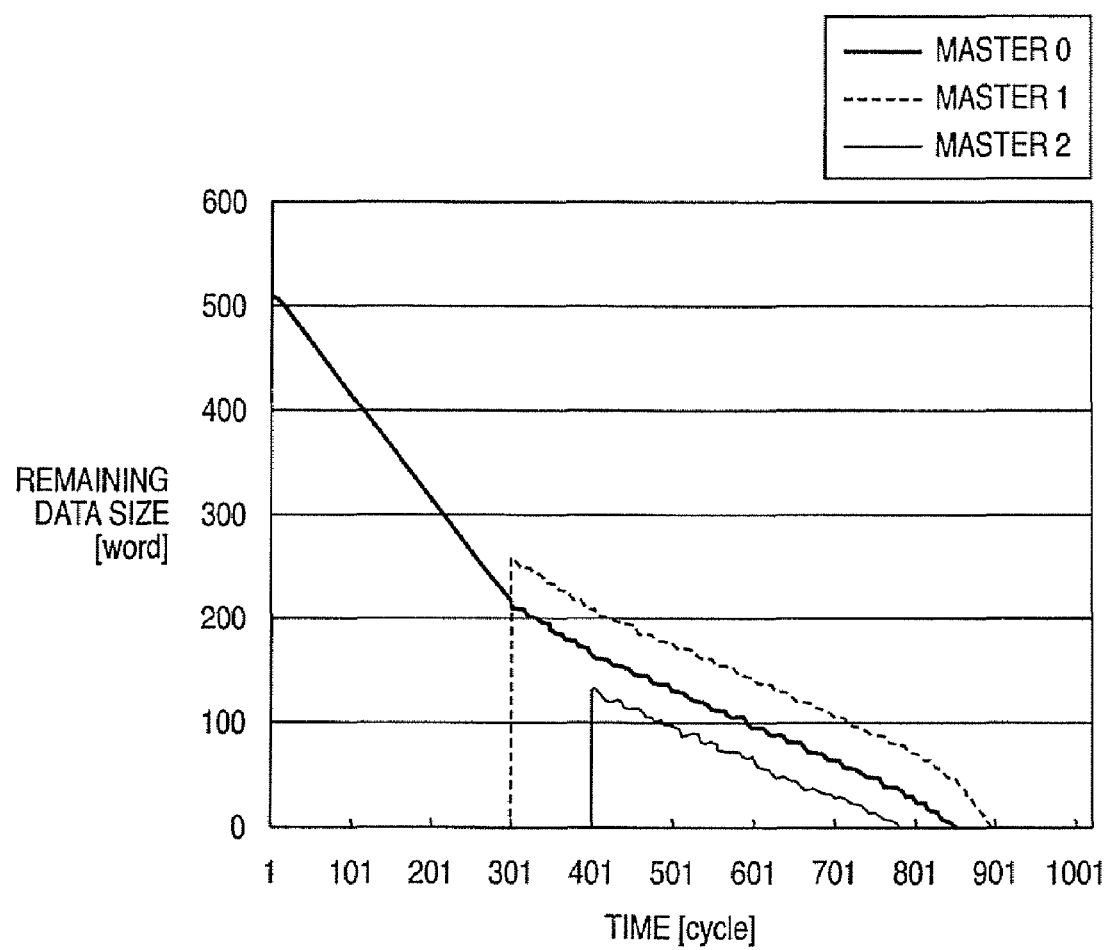
FIG. 10 is a graph for explaining an example in which deadline guarantee cannot be attained by an arbitration algorithm based on the round robin.
Figure 11:
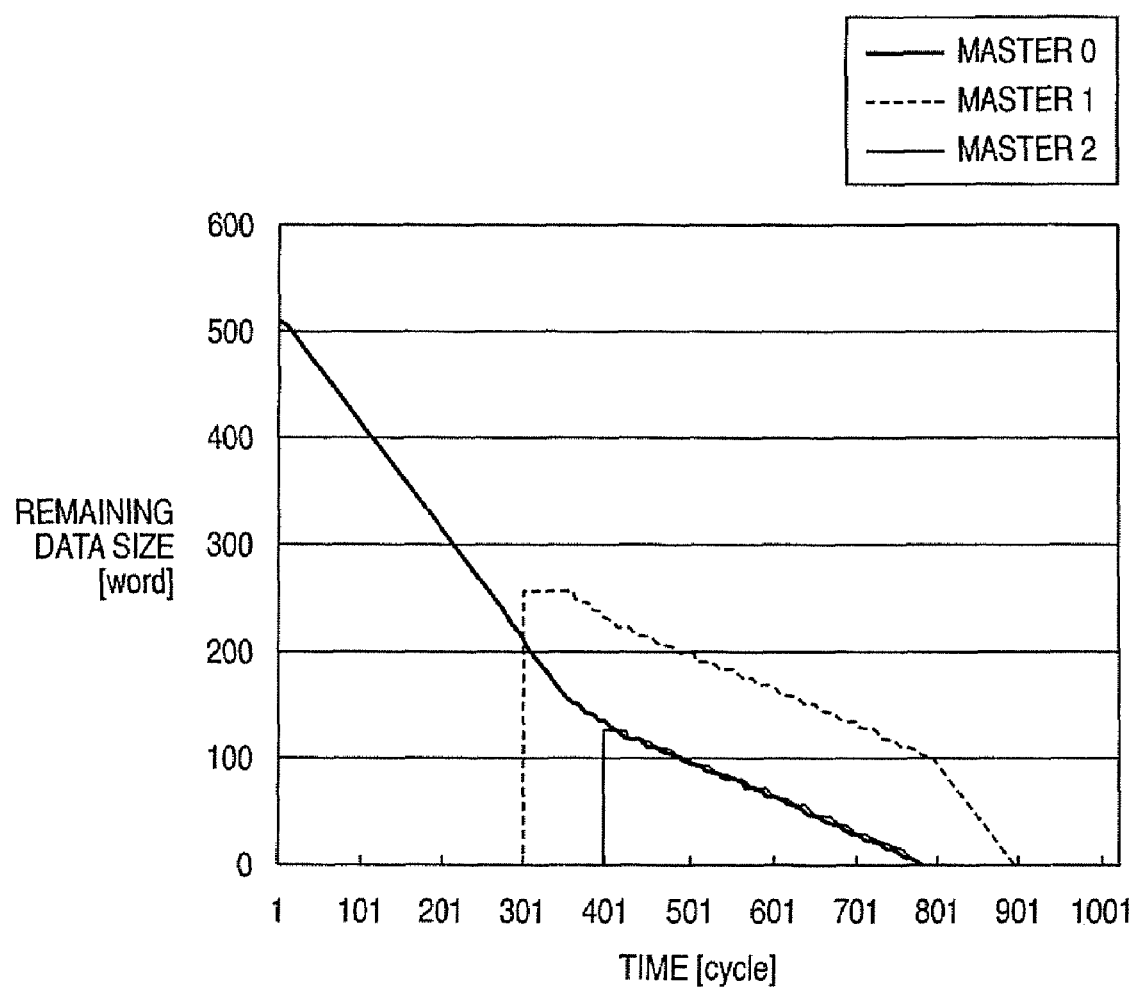
FIG. 11 is a graph showing an example in which deadline guarantee can be attained under the transfer conditions shown in FIG. 10.

FIG. 11 is a graph showing an example in which deadline guarantee can be attained under the transfer conditions shown in FIG. 10.

FIG. 10 is a graph showing an example in which deadline guarantee cannot be attained by an arbitration algorithm based on the round robin scheme. In FIG. 10, in a bus system capable of transferring 1 word per cycle (1 word=4 bytes), three bus masters transfer a total of 896 words. The deadlines of masters 0 and 2 are the 800-th cycle. The deadline of master 1 is the 1100-th cycle. The data transfer sizes of the respective bus masters are 512 bytes (master 0), 256 bytes (master 1), and 128 bytes (mater 2). In FIG. 10, since bus arbitration is made based on a simple round robin scheme, transfer completion of master 0 exceeds the deadline of the 800-th cycle, and deadline guarantee cannot be attained.

By contrast, in FIG. 11, master 0 denoted by reference numeral 14 is granted the bus right permission many times in preference to masters 1 and 2 denoted by reference numerals 15 and 16. In this way, deadline guarantee can be attained, and the deadline of master 2 can also be guaranteed.

Figure 12:
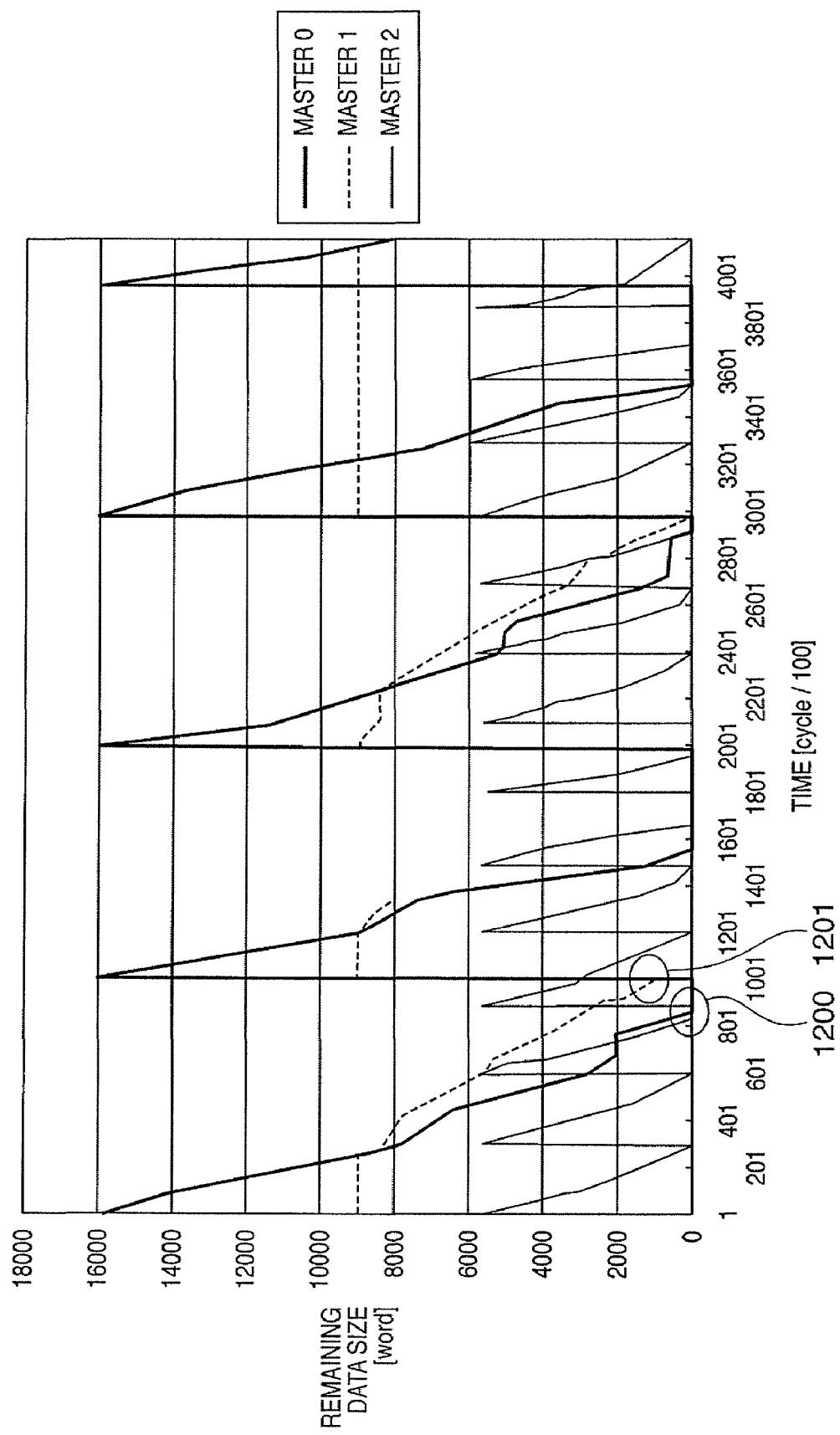
FIG. 12 is a graph for explaining an example in which deadline guarantee cannot be attained since the transfer capabilities of bus masters are not considered.
Figure 13:
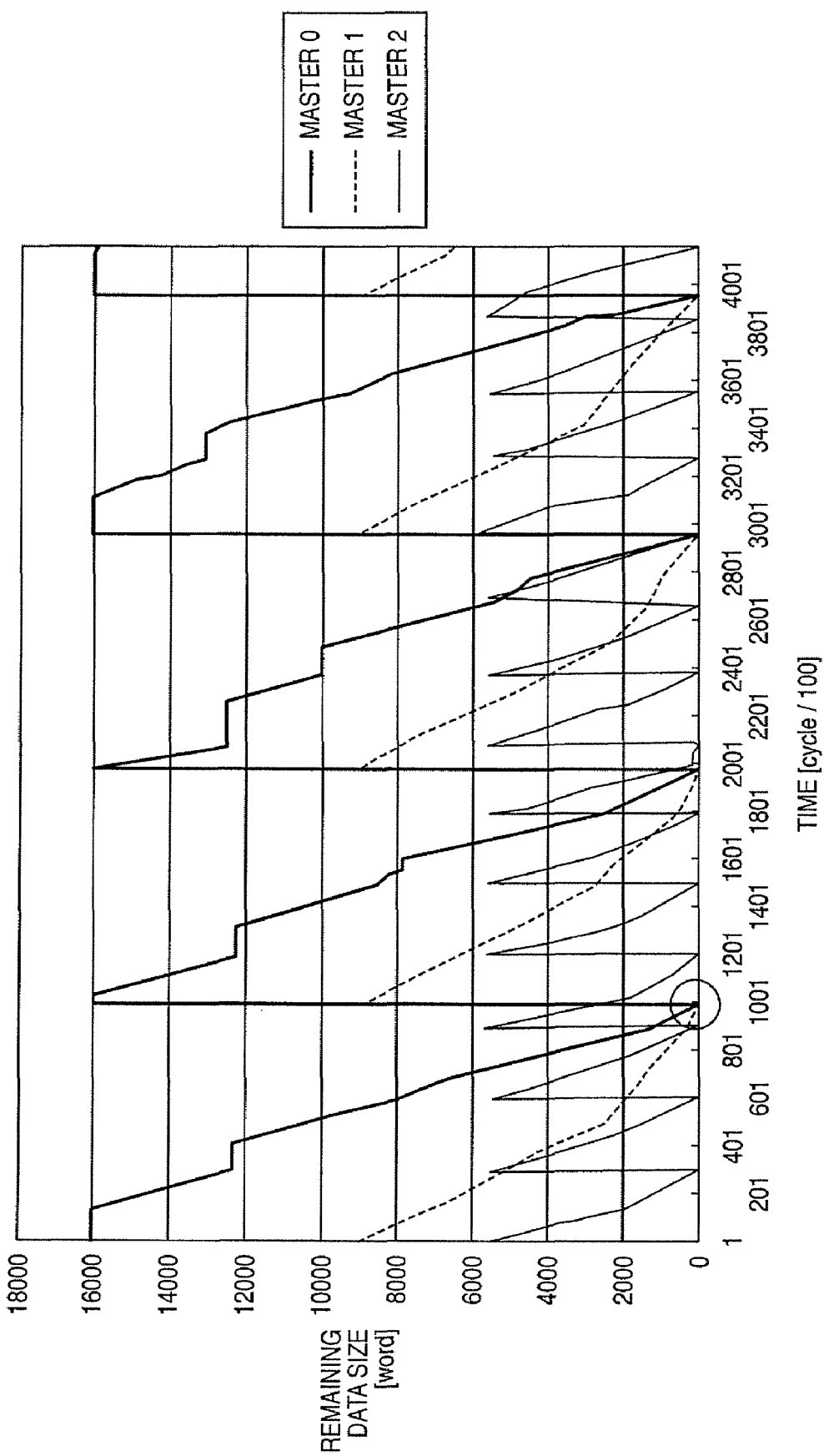
FIG. 13 is a graph showing an example in which deadline guarantee can be attained by applying the fourth embodiment to the transfer conditions in FIG. 12.

FIG. 13 is a graph showing an example in which deadline guarantee can be attained by applying the fourth embodiment to the transfer conditions in FIG. 12.

FIG. 12 is a graph showing an example in which deadline guarantee cannot be attained since the transfer capabilities of bus masters are not considered. The transfer capability of the bus master includes the number of transfer bits per cycle, the frequency of issuance of data transfer requests, and the like, and the data transfer conditions of respective bus masters in FIG. 12 are as follows.

Master 0 guarantees transfer of 16000 words within 100000 cycles, and has a transfer capability of 0.57 words/cycle and a bus request interval=1 cycle. Master 1 guarantees transfer of 9000 words within 100000 cycles, and has a transfer capability of 0.14 words/cycle and a bus request interval=25 cycles. Master 2 guarantees transfer of 5000 words within 30000 cycles, and has a transfer capability of 0.4 words/cycle and a bus request interval=8 cycles.

In FIG. 12, master 0 with a high transfer capability completes data transfer well in advance (1200). By contrast, the deadline guarantee of master 1 with a low transfer capability cannot be attained (1201).

To solve this problem, the fourth embodiment performs arbitration in consideration of the transfer capability register 114 of each bus master in addition to the ratio of the values of the remaining transfer time register 124 and remaining transfer data size register 125. In this way, as shown in FIG. 13, the deadline guarantee can be attained even for master 1 denoted by reference numeral 15 whose deadline guarantee cannot be attained in FIG. 12.

Fifth Embodiment

Figure 14:
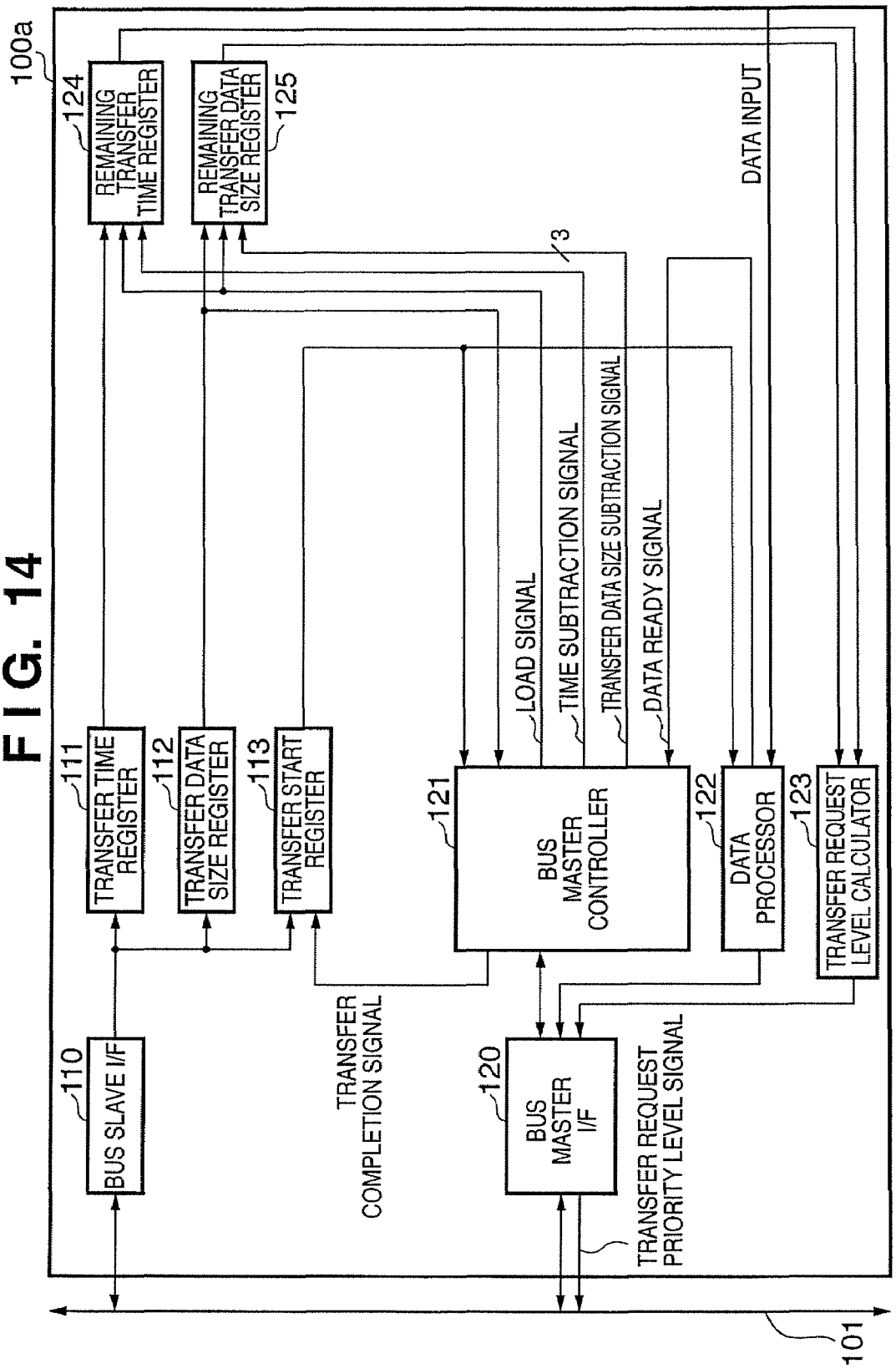
FIG. 14 is a block diagram showing the arrangement of a bus master according to a fifth embodiment of the present invention.

FIG. 14 is a block diagram showing the arrangement of a bus master 100a according to the fifth embodiment of the present invention. The same reference numerals denote parts common to FIG. 7 of the third embodiment, and a description thereof will be omitted. In FIG. 14, the transfer capability register 114 is omitted compared to FIG. 7.

The arrangement of a system using this bus master 100a is the same as that shown in FIG. 8 above.

Details of the bus master 100a according to the fifth embodiment will be described below.

When the CPU 41 on the bus 101 writes "1" in the transfer start register 113, the bus master controller 121 asserts a load signal to the remaining transfer time register 124 and remaining transfer data size register 125. In response to this signal, the value of the transfer time register 111 is copied to the remaining transfer time register 124, and that of the transfer data size register 112 is copied to the remaining transfer data size register 125. After that, the bus master controller 121 asserts a time subtraction signal to the remaining transfer time register 124 for every 1 μs. Also, the bus master controller 121 asserts a subtraction signal of a data transfer size for the number of transferred bytes to the remaining transfer data size register 125 every time data transfer is made. For example, in the fifth embodiment, 1 word on the bus 101 has 32 bits. For this reason, the controller 121 asserts a transfer data size subtraction signal "4" for 1-word transfer; it asserts "2" for half-word transfer; and it asserts "1" for byte transfer. The remaining transfer data size register 125 subtracts the value of the transfer data size subtraction signal from its own value.

With the above processing, the values of the remaining transfer time register 124 and remaining transfer data size register 125 are subtracted to appropriately update the values of the remaining transfer time period and remaining transfer data size.

The data processor 122 is also activated when "1" is written in the transfer start register 113. When the data processor 122 is ready to transmit or receive data, it asserts a data ready signal to the bus master controller 121. Upon assertion of this data ready signal, the bus master controller 121 controls the bus master I/F 120 to assert a transfer request signal to an arbiter (corresponding to the arbiter 42 in FIG. 8) on the bus 101.

On the other hand, the transfer request level calculator 123 calculates the priority level of the data transfer based on the values of the remaining transfer time register 124 and remaining transfer data size register 125.

The calculation in the transfer request level calculator 123 according to the fifth embodiment is "value of remaining transfer data size register 125/value of remaining transfer time register 124". With this calculation, the transfer request priority level increases with decreasing remaining time period in a case that the remaining data size remains the same.

On the other hand, the transfer request priority level increases with increasing remaining data size, in a case that the remaining time period remains the same. The bus master I/F 120 outputs the calculation result of the transfer request level calculator 123 to the arbiter 42 as a transfer request priority level signal. The assert timing of this transfer request priority level signal falls within an identical cycle to start of assertion of the transfer request signal, and the value is held until completion of the data transfer.

The arbiter 42 preferentially grants a transfer permission to the bus master which sent a transfer request priority level signal having a larger value. In a case that there are a plurality of bus masters which sent a transfer request priority level signal having a maximum value, the arbiter 42 makes bus arbitration using the round robin scheme for the bus masters with the maximum value.

With the above arrangement and method, appropriate deadline guarantee can be made for respective bus masters.

Sixth Embodiment

The schematic block diagram showing the arrangement of another system using the bus master 100a is the same as the arrangement of FIG. 9 above.

In this system, a hierarchy structure of two buses, i.e., the upper layer bus 50 and lower layer bus 60, is adopted. The arbiter 52 performs bus arbitration on the upper layer bus 50, and the arbiter 61 performs bus arbitration on the lower layer bus 60. Transfer across the bus layers is made via the bus bridge 56. The example of transfer across the bus layers in this case is the same as the above description given with reference to FIG. 9, and a description thereof will be omitted.

Seventh Embodiment

Figure 15:
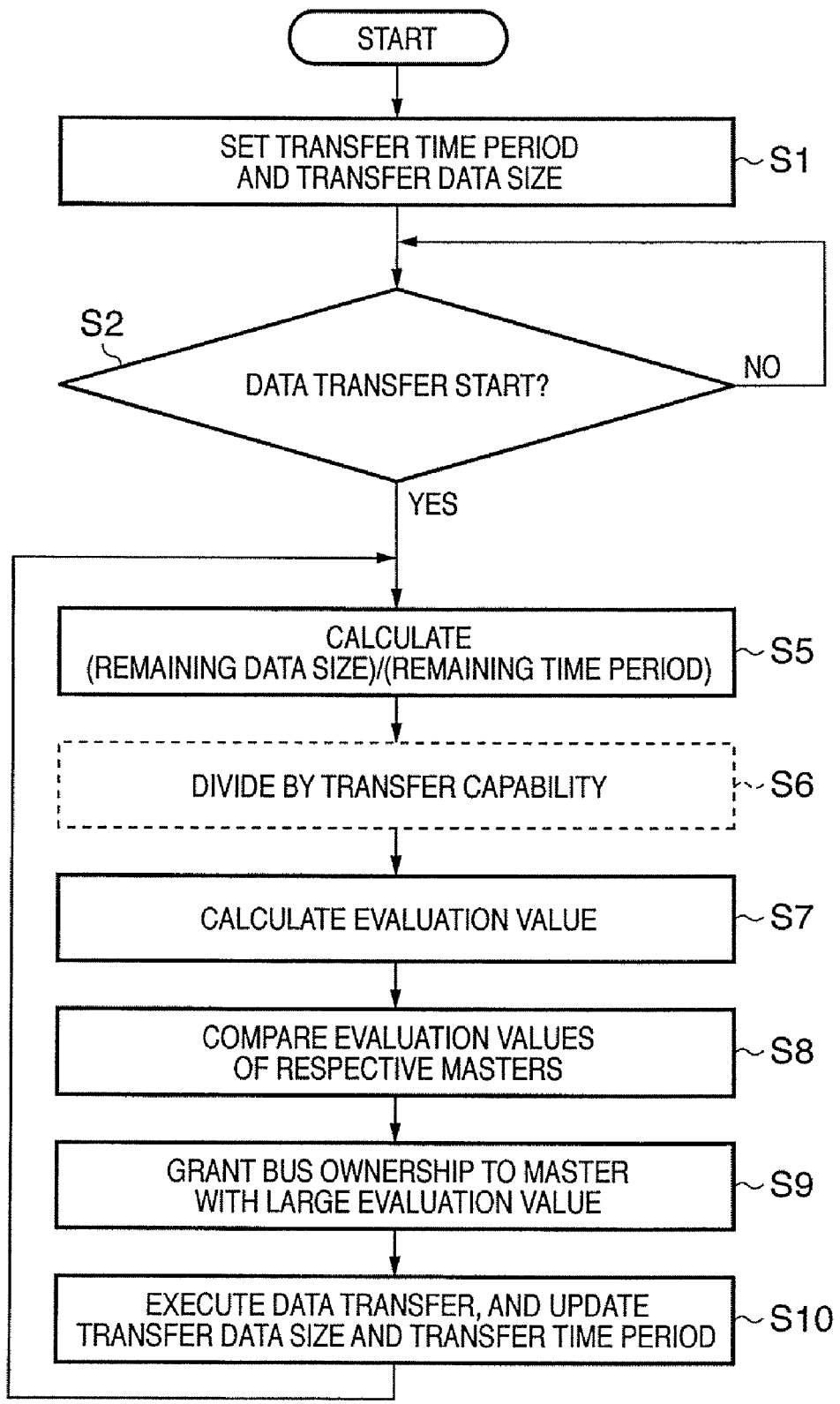
FIG. 15 is a flowchart for explaining processing in a bus arbiter according to the fifth embodiment.

The seventh embodiment of the present invention will be described below. Since the arrangement of a bus arbiter of the seventh embodiment is the same as that in FIG. 1 of the first embodiment, a description thereof will be omitted. FIG. 15 is a flowchart for explaining processing in the bus arbiter according to the seventh embodiment.

In step S1, the arbiter sets a transfer time period for executing data transfer, and its transfer data size in respective registers. In step S2, the process waits for a data transfer start instruction. Upon detection of the data transfer start instruction, the process advances to step S5 to calculate (remaining data size)/(remaining time period). In step S6, in the example of FIG. 4, the arbiter divides the value calculated in step S5 by the transfer capability value. However, this step S6 can be omitted in case of the bus arbiter corresponding to FIG. 2. In step S7, the arbiter calculates the evaluation value of that master based on expression (1) or (2) above. The arbiter executes the processes in steps S1 to S7 for each master. In step S8, the arbiter compares the evaluation values calculated for respective masters, and selects a master with the largest evaluation value. In step S9, the arbiter grants an ownership of the bus to the selected master. In step S10, the arbiter executes data transfer between the master selected for that data transfer and a slave, and updates the transfer data size and transfer time period of that master in synchronism with the data transfer.

In the above description, the bus arbiter executes respective steps. However, each bus master may execute steps S1 to S7. The bus arbiter may receive the evaluation values calculated in step S7, and compare them in step S8 to grant a bus ownership to the master with the larger evaluation value in step S9. In this mode, each bus master executes step S10, and also steps S5 to S7 to supply its evaluation value to the bus arbiter.

The bus arbiter or bus master according to this embodiment can execute arbitration processing for grating a bus ownership to each master.

Other Embodiments

The preferred embodiments of the present invention have been explained, and the present invention can be applied to either a system constituted by a plurality of devices, or an apparatus consisting of a single equipment.

Note that the present invention can be achieved by directly or remotely supplying a program that implements the functions of the aforementioned embodiments to a system or apparatus, and reading out and executing the supplied program code by a computer of that system or apparatus. In the above embodiments, such programs are those corresponding to the flowchart shown in FIG. 15. In this case, the form of program is not particularly limited as long as it has a program function. Therefore, the program code itself installed in a computer to implement the functional processing of the present invention using the computer achieves the present invention. In this case, the form of program is not particularly limited, and an object code, a program to be executed by an interpreter, script data to be supplied to an OS, and the like may be used as along as they have the functions of the program.

Various recording media for supplying the program can be used. For example, hard disk, optical disk, magneto-optical disk, MO, CD-ROM, CD-R, CD-RW, magnetic tape, non-volatile memory card, ROM, DVD (DVD-ROM, DVD-R), and the like can be used.

As another program supply method, the program may be supplied by establishing connection to a home page on the Internet using a browser on a client computer, and downloading the program from the home page onto a recording medium such as a hard disk or the like. In this case, the program to be downloaded includes the computer program itself of the present invention or a compressed file including an automatic installation function. Also, the program code that forms the program of the present invention may be segmented into a plurality of files, which may be downloaded from different home pages. That is, the claims of the present invention include a WWW server which makes a plurality of users download program files required to implement the functional processing of the present invention by the computer.

Also, a storage medium such as a CD-ROM or the like, which stores the encrypted program of the present invention, may be delivered to the user. In this case, the user who has cleared a predetermined condition may be allowed to download key information used to decrypt the encrypted program from a home page via the Internet, and the program encrypted using that key information may be installed in a computer in an executable form.

The present invention can be implemented in a mode other than the mode for implementing the functions of the aforementioned embodiments by executing the readout program code by the computer. For example, the functions of the aforementioned embodiments can also be implemented by some or all of actual processing operations executed by an OS or the like running on the computer on the basis of an instruction of that program.

Furthermore, the program read out from the recording medium may be written in a memory of an extension board or a function extension unit, which is inserted in or connected to the computer. In this case, the functions of the aforementioned embodiments are implemented by some or all of actual processes executed by a CPU or the like arranged in the function extension board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2005-314842, filed Oct. 28, 2005, which is hereby incorporated by reference herein in its entirety.

What is claimed is:

1. A method of arbitrating a plurality of bus access requests from a plurality of devices connected to a bus, comprising the steps of:

setting a required data size to be transferred individually by each of the plurality of the devices via the bus;

setting a required transfer time period for transferring the data individually by each of the plurality of the devices via the bus;

measuring a remaining time period until the required time period which is individually set by each of the plurality of the devices has elapsed;

calculating a remaining data size to be transferred via the bus based on the required data size to be transferred by each of the plurality of the devices and on a transferred data size which has been transferred by each of the plurality of devices at each time when the data is transferred by each of the plurality of devices;

setting the priority level of each of the plurality of the devices for transferring data via the bus based on a ratio between the remaining time period measured in the measuring step and the remaining data size calculated in the calculating step, with respect to the each of the plurality of devices; and arbitrating the plurality of bus access requests from the plurality of devices in accordance with the priority level of each of the plurality of devices for transferring data via the bus.

2. The method according to claim 1, wherein the arbitrating step comprises a step of selecting one of the plurality of devices to be permitted to transfer data in accordance with the priority level of each of the plurality of the devices.

3. The method according to claim 1, wherein the calculating step comprises a step of monitoring the bus, and measuring a transferred data size via the bus with respect to the each of the plurality of devices.

4. The method according to claim 1, wherein the setting step of the priority level comprises a step of setting the priority level of each of the plurality of devices based on the remaining time period, the remaining data size, and a transfer capability of each of the plurality of devices.

5. The method according to claim 1, wherein the setting step of the priority level comprises a step of notifying an arbiter of the priority level of each of the plurality of devices.

6. The method according to claim 1, wherein the required transfer time period setting step comprises a step of receiving a setting of the required transfer time period for transferring the data by each of the plurality of devices from an external device.

7. The method according to claim 1, wherein the required data size setting step comprises a step of receiving a setting of the required data size to be transferred by the each of the plurality of devices from an external device.

8. A bus arbitration apparatus for arbitrating a plurality of bus access requests from a plurality of devices connected to a bus, comprising:

a required data size setting unit configured to set a required data size to be transferred via the bus individually by each of the plurality of devices;

a required transfer time period setting unit configured to set a required transfer time period for transferring the data via the bus individually by each of the plurality of devices;

a time measuring unit configured to measure a remaining time period until the required transfer time period which is individually set by each of the plurality of devices has elapsed;

a remaining data size calculating unit configured to calculate a remaining data size to be transferred via the bus based on the required data size to be transferred by each of the plurality of devices and on a transfer data size which has been transferred by each of the plurality of the devices at each time when the data is transferred by each of the plurality of devices;

an urgency calculation unit configured to calculate the urgency of the data transfer of each of the plurality of devices based on a ratio between the remaining time period measured by the time measuring unit and the remaining data size calculated by the remaining data size calculation unit, with respect to the each of the plurality of devices; and an arbitration unit configured to arbitrate the plurality of bus access requests from the plurality of devices in accordance with the urgency of the data transfer of each of the plurality of devices.

9. The apparatus according to claim 8, wherein the arbitration unit selects one of the plurality of devices to be permitted to transfer data in accordance with the urgency of the data transfer of each of the plurality of the devices.

10. The apparatus according to claim 8, wherein the remaining data size calculation unit monitors the bus, and measures a transferred data size via the bus with respect to the each of the plurality of devices.

11. The apparatus according to claim 8, wherein the urgency calculation unit calculates the urgency of the data transfer of each of the plurality of devices based on the remaining time period, the remaining data size, and a transfer capability of each of the plurality of devices.

12. The apparatus according to claim 8, wherein the required transfer time period setting unit receives a setting of the required transfer time period for transferring the data by each of the plurality of devices from an external device.

13. The apparatus according to claim 8, wherein the required data size setting unit receives a setting of the required data size to be transferred by each of the plurality of devices from an external device.

14. An apparatus having a plurality of devices connected to a bus, for arbitrating a plurality of bus access requests by the plurality of devices, comprising:

a required data size setting unit configured to set a required data size to be transferred via the bus individually by each of the plurality of devices;

a required transfer time period setting unit configured to set a required transfer time period for transferring the data via the bus individually by each of the plurality of devices;

a time measuring unit configured to measure a remaining time period until the required transfer time period which is individually set by each of the plurality of devices has elapsed;

a calculation unit configured to calculate a remaining data size to be transferred via the bus based on the required data size to be transferred by each of the plurality of devices and on a transferred data size which has been transferred by each of the plurality of the devices at each time when the data is transferred by each of the plurality of devices;

a setting unit configured to set a priority level of each of the plurality of devices for transferring data via the bus based on the remaining time period measured by the time measuring unit and the remaining data size calculated by the calculation unit, with respect to the each of the plurality of devices; and an arbitration unit configured to arbitrate the plurality of bus access requests from the plurality of devices in accordance with the priority level of each of the plurality of devices for transferring data via the bus.

15. The apparatus according to claim 14, wherein the calculation unit monitors the bus, and measures a transferred data size via the bus with respect to the each of the plurality of devices.

16. The apparatus according to claim 14, wherein the setting unit sets the priority level of each of the plurality of devices based on the remaining time period, the remaining data size, and a transfer capability of each of the plurality of devices.

17. The apparatus according to claim 14, wherein the setting unit notifies the arbitration unit of the priority level of each of the plurality of devices.

18. A bus master apparatus for accessing to a bus by sending a bus access request to an arbiter which arbitrates bus access requests, comprising:

a transfer unit configured to transfer data to the bus;

a required data size setting unit configured to set a required data size to be transferred to the bus by the transfer unit;

a required transfer time period setting unit configured to set a required transfer time period for transferring the data to the bus by the transfer unit;

a time measuring unit configured to measure a remaining time period until the required transfer time period for transferring the data by the transfer unit has elapsed;

a calculation unit configured to calculate a remaining data size to be transferred to the bus based on the required data size to be transferred by the transfer unit and on a transferred data size which has been transferred by the transfer unit at each time when the data is transferred by the transfer unit;

a setting unit configured to set a priority level of the bus access request based on a ratio between the remaining time period measured by the time measuring unit and the remaining data size calculated by the calculation unit; and a sending unit configured to send the bus access request and send the priority level set by the setting unit to the arbiter such that the arbiter arbitrates the bus access request in accordance with the priority level.

19. The apparatus according to claim 18, wherein the setting unit sets the priority level of the bus access based on the remaining time period, the remaining data size, and a transfer capability of the transfer unit.

* * * * *